United States Patent
Kamath

(10) Patent No.: US 9,534,692 B2
(45) Date of Patent: Jan. 3, 2017

(54) 3 DIRECTIONAL ROTARY SEAL FOR FLUID HANDLING MACHINES

(71) Applicant: Das Ajee Kamath, Pune (IN)

(72) Inventor: Das Ajee Kamath, Pune (IN)

( * ) Notice: Subject to any disclaimer, the term of this patent is extended or adjusted under 35 U.S.C. 154(b) by 0 days.

(21) Appl. No.: 15/030,254

(22) PCT Filed: Oct. 9, 2014

(86) PCT No.: PCT/IN2014/000648
§ 371 (c)(1),
(2) Date: Apr. 18, 2016

(87) PCT Pub. No.: WO2015/075731
PCT Pub. Date: May 28, 2015

(65) Prior Publication Data
US 2016/0265666 A1    Sep. 15, 2016

(30) Foreign Application Priority Data
Oct. 16, 2013    (IN) .......................... 3249/MUM/2013

(51) Int. Cl.
*F16J 15/18*    (2006.01)
*F16J 15/34*    (2006.01)
(Continued)

(52) U.S. Cl.
CPC ............ *F16J 15/3404* (2013.01); *F16J 15/342* (2013.01); *F16J 15/3452* (2013.01); *F04C 15/0038* (2013.01); *F04C 27/009* (2013.01)

(58) Field of Classification Search
CPC .......... F16J 15/16; F16J 15/34; F16J 15/3404; F16J 15/3436; F16J 15/344; F16J 15/3452; F16J 15/3472; F16J 15/3488
See application file for complete search history.

(56) References Cited

U.S. PATENT DOCUMENTS 3,625,524 A * 12/1971 Vergales .............. F16J 15/3488
                                                    277/397
4,759,554 A *  7/1988 Kemp .................. F16J 15/3464
                                                    277/362
(Continued)

FOREIGN PATENT DOCUMENTS

EP        2284427 A2    2/2011
WO    2010121866 A2   10/2010

OTHER PUBLICATIONS

International Search Report mailed Apr. 28, 2015 in corresponding Indian Patent Application No. PCT/IN2014/000648, 2 pages.

*Primary Examiner* — Gilbert Lee
(74) *Attorney, Agent, or Firm* — Carter, DeLuca, Farrell & Schmidt, LLP

(57) ABSTRACT

A rotary seal (10) for a fluid handling machine comprising first circular body (12) with circumferential surface (28) and second circular body (16) with similar surface (27), such that the bodies when coaxially assembled, the circumferential surface (28) and similar surface (27) mate with each other forming a sealing surface contact. An internal end face (33) of rotary seal (10) is exposed to fluids with an inclination, such that the fluid pressure on internal end face (33) adds to contact force at sealing contact surface. The first circular body (12) is continuous and second circular body (16) with a split (17) has a spring characteristic such that two ends formed by the split (17), force away from each other, hence exerting a radial force on circumferential surface when assembled with first circular body (12) and compensating for circumferential wear during operation. The second circular body (16) exerts combination of axial, radial and tangential forces on circumferential surface (28) which results in force closure at sealing surface contact.

9 Claims, 2 Drawing Sheets

(51) Int. Cl.
*F04C 27/00* (2006.01)
*F04C 15/00* (2006.01)

(56) References Cited

U.S. PATENT DOCUMENTS

| | | | | |
|---|---|---|---|---|
| 4,795,169 A * | 1/1989 | Lowe | ................... | F16J 15/3464 277/388 |
| 5,577,739 A * | 11/1996 | Ciotola | ................ | F16J 15/3472 277/380 |
| 6,412,784 B1 * | 7/2002 | Cohen | ................... | F16J 15/184 277/385 |
| 2011/0140369 A1 | 6/2011 | Lenhert | | |

* cited by examiner

3 DIRECTIONAL ROTARY SEAL FOR FLUID HANDLING MACHINES

CROSS-REFERENCE TO RELATED APPLICATIONS

This application is a U.S. National Stage Application filed under 35 U.S.C. 371 of International Application No. PCT/IN2014/000648 filed on Oct. 9, 2014, which claims priority to and the benefit of Indian Application No. 3249/MUM/2013 filed on Oct. 16, 2013, the entire contents of both applications are incorporated by reference herein.

FIELD OF INVENTION

The present invention relates to field of seals for fluid handling machines and more particularly relates to seals for rotary machines handling fluids under pressure or vacuum like rotary I.C. Engines, compressors, pumps and fluid motors and the likes.

BACKGROUND OF INVENTION

The usage of mechanical seals is well known in fluid handling machines like pumps, fluid motors etc., and the sealing is generally accomplished by contact pressure between two highly polished surfaces of, a seal stator fitted on machine casing and a seal rotor mounted on machine rotor or shaft. Sealing is achieved in these conventional mechanical seal in two directions namely—the radial direction perpendicular to the machine rotor or shaft axis and along the shaft surface in the axial direction. However the peripheral surface area of machine rotor or shaft, that faces the portion of casing thickness where the seal stator element is supported and the portion of the seal stator thickness which bears the rotor element of the seal, is exposed to fluid during operations. The fluid gets trapped at the clearance between the casing and the machine rotor in the area between 'casing inner end edge' and the 'contact sealing surface point'. The amount of fluid trapped depends on above mentioned clearance, surface area at mentioned clearance and the operating fluid pressure. The trapped fluid is thwarted from leaking to spaces outside the casing of the fluid handling machine by the mechanical seal, however the trapped fluid connects the fluid spaces entrapped between casing and rotor and segregated by the rotor body elements that characterizes rotary machine and project radial from the rotor body or are fitted on the rotor to work on or be worked upon by working fluid within the fluid handling machine during operation like gears teeth, vanes etc. These spaces are not effectively sealed from each other and hence reducing volumetric efficiency and reducing performance. These leakages also render loss in compression in rotary engines resulting in inability of engine to attain combustion. Generally the quantity of mentioned trapped fluid is reduced by the 'rotor body end surface' inside the casing/stator, that shrouds rotor/shaft peripheral surface clearance at the seal area to avoid direct exposure to internal fluid, for example in gear pumps the Dedendum circle is of greater diameter than the puncture in the casing at rotor penetration point where the mechanical seal is fitted. The greater diameter shrouds the casing penetration area and a very fine working clearance between 'rotor body end surface' and casing is maintained, which provides an effective end face barrier that reduces leak off to periphery surfaces of rotor at sealing areas in fluid handling machines. The requirement of shrouding of casing at the seal stator holding area, constraint's the volume maximisation of segregated fluid space volume that is desired for maximising fluid throughput in fluid handling machines of given size and volume. It also hinders reduction in rotor body material quantity, weight and size. These limitations and draw backs that detrimentally influence volumetric efficiency, compression, sustaining of combustion & fluid throughput. It limits the optimization of parameters like weight, size, volume and cost of material in fluid handling machines due to usage of conventional mechanical seals.

It is therefore advantageous to provide an improved means of sealing which overcomes the aforesaid problems, and/or provides various other benefits and advantageous.

SUMMARY OF INVENTION

One embodiment of the present invention discloses a rotary seal for a fluid handling machine comprising, a first circular body with a circumferential surface that has an inclination to the central axis of said first circular body and a second circular body with a similar surface that is inclined to the central axis of said second circular body such that said second circular body when assembled with said first circular body coaxially, said circumferential surface and said similar surface mate with each other forming a sealing surface contact, wherein said first circular body and said second circular body is mounted on said fluid handling machine that constitute a rotor part and a stator part, such that an internal end face of said rotary seal when assembled on fluid handling machine is exposed to fluids handled by said fluid handling machine, wherein said inclination is such that the fluid pressure on said internal end face adds to the contact force at said sealing contact surface, wherein said first circular body is continuous and said second circular body has a split and said second circular body has a spring characteristic such that the two ends formed by the split, force away from each other, hence exerting a radial force on said circumferential surface when assembled with said first circular body and compensating for circumferential wear during operation, wherein said second circular body, includes an inclined surface that results in exerting an axial force on said rotor part of said fluid handling machine on which said second circular body is mounted on, by an external spring on an external end face, wherein said second circular body exerts a combination of axial, radial and tangential forces on said circumferential surface which results in the force closure at said sealing surface contact, such that said rotary seal does not require complete shrouding of said internal end face and the edge of said sealing surface contact, from fluid within the casing during operation.

In another embodiment, the second circular body has a lip such that said spring characteristics imparts said lip a tendency to flare outward wherein said lip exerts a radial force on said circumferential surface and compensates for wear along axial directions.

In another embodiment, the rotor part is fitted with a rotor body element that segregates the volume between said rotor part shrouds said split, thus avoiding exposure of the split from working fluid in fluid spaces and provides the rotor body elements as a point of its fixation for said spacer on the rotor such that said second circular body is imparted with torsion from the rotor part for rotating said second circular body along with rotor part.

In another embodiment, the first circular body and said second circular body have said lip that exerts contact pressure at the said sealing surface contact, wherein said first circular body and said second circular body includes said inclined surface such that said inclination is such that the force by fluid pressure on said internal end face adds to the force at said sealing surface contact.

In another embodiment, the split is fitted with a spacer with a pair of legs with springiness that forms a second sealing contact surface with the two ends of said split to block any leakage and to exert an additional parting force on the two ends of said split.

In another embodiment, the spacer is inclined in at least in any one of axial and radial directions.

In another embodiment, the second circular body comprises at least a manifold for supply of lubricating oil through at least an oil hole to a void to supply oil through at least a groove with distribution channel for the lubricant supply at said sealing surface contact between said first circular body and said second circular body such that the lubricating oil also acts as a coolant for cooling of said rotary seal.

In another embodiment, the first circular body and said second circular body has at least a manifold for supply of lubricating oil through at least an oil hole to said void to supply oil through at least a groove with distribution channel for lubricant supply at said sealing surface contact between said first circular body and said second circular body such that the lubricating oil also acts as a coolant for cooling of said rotary seal.

In another embodiment, at least one of said manifold and said oil hole is used for lubricating and at least one of said manifold and said oil hole is used for cooling.

Figure 1:
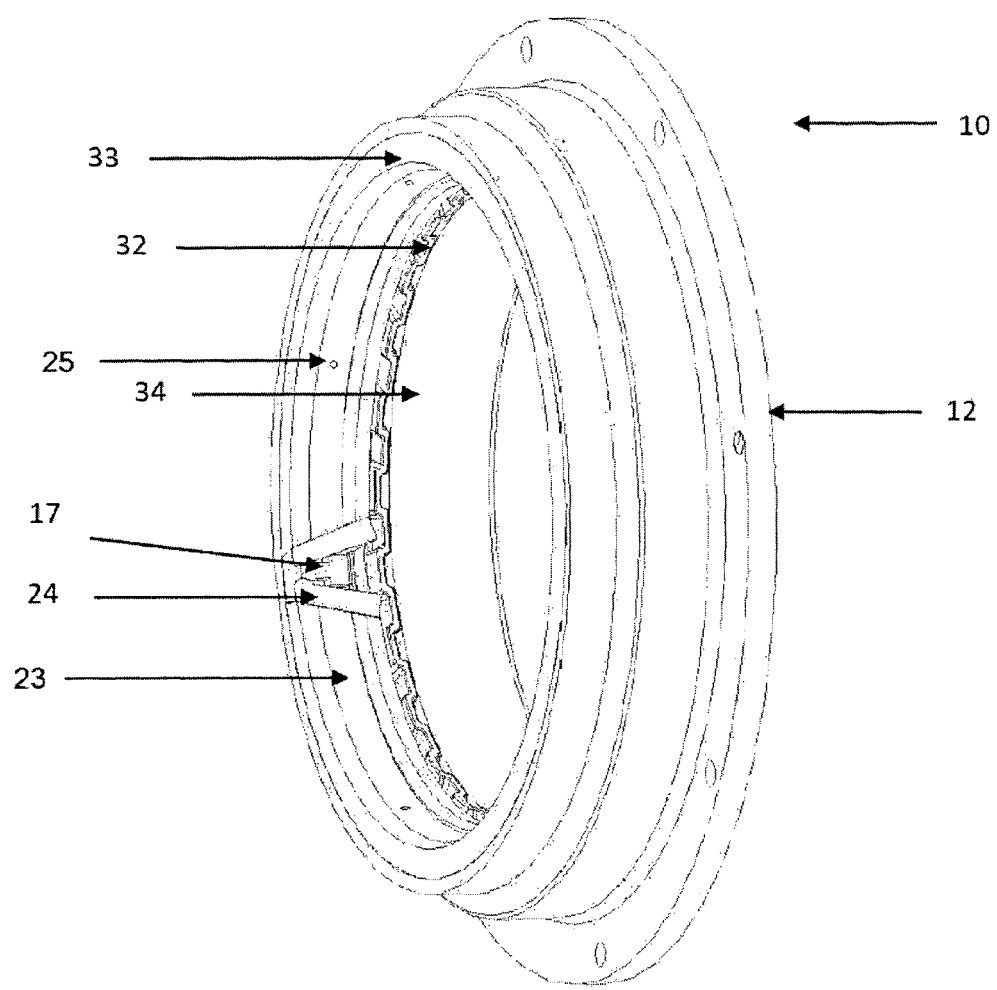
FIG. 1 illustrates an exemplary embodiment of the present invention depicting an isometric view of the Seal.

| Description of Elements | Reference Numeral |
|---|---|
| Rotary Seal | 10 |
| First Circular Body | 12 |
| Lip | 14 |
| Second Circular Body | 16 |
| Split | 17 |
| First Split End | 18 |
| Second split End | 20 |
| Fluid space | 21 |
| Voids | 22 |
| Manifold | 23 |
| Spacer | 24 |
| Oil hole | 25 |
| Grooves | 26 |
| Similar surface | 27 |
| Circumferential surface | 28 |
| Inclined Surfaces | 29 |
| Rotor Part | 30 |
| External End Face | 31 |
| External Spring | 32 |
| Internal End Face | 33 |
| Back Plate | 34 |
| Stator Part | 36 |

DETAILED DESCRIPTION OF INVENTION

The present invention can be fully understood by reading following detail description of some of the embodiments with reference to the accompanying drawings.

In an embodiment of present invention a rotary seal (10) as shown in FIG. 1 which has a first circular body (12) that has a shape of a ring and a circumferential surface (28), and of the two circumferential surfaces, circumferential surface (28) is inclined at an angle to the axis of the ring. The other circumferential surface may also be inclined depending on design. Here, in the embodiment the inner surface is the surface with the inclination. This first circular body (12) is fitted on the stator and held rigidly to it. In this embodiment a second circular body (16) with a similar surface (27) is assembled with the first circular body (12) and its outer circumferential surface is a similar surface (27) inclined to match up and mate with the circumferential surface (28) of the first circular body (12). The two inclined surfaces that mate with each other form a sealing surface contact and have two edges, an inner edge and an outer edge. The inner edge is directly exposed to fluid in the fluid handling machine and the outer edge is exposed to the spaces outside. The end faces of the first circular body (12) and the second circular body (16) having the inner edge as its part, is exposed to the fluids and the fluid pressure acts on this internal end face (33).

Figure 2:
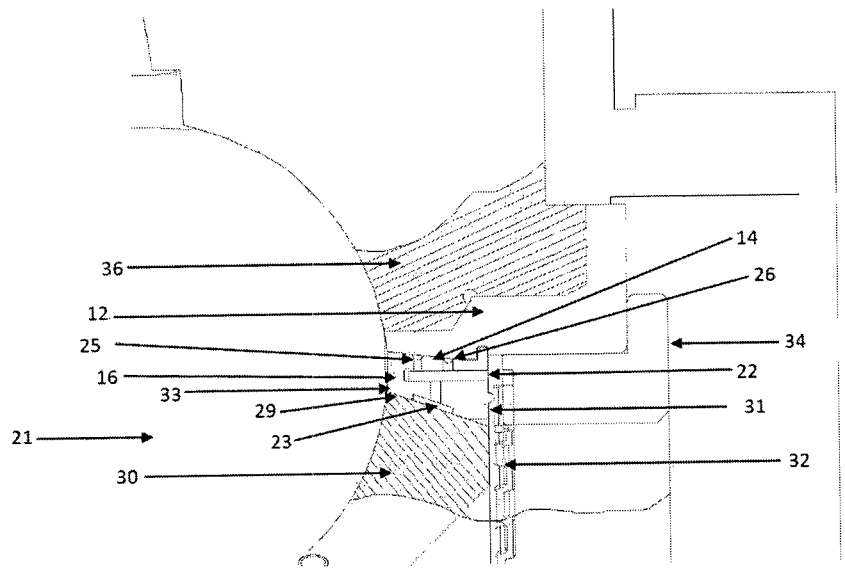
FIG. 2 illustrates an exemplary embodiment of the present invention depicting sectional view of functioning of seal with stator and rotor parts fitted on fluid handling machine stator and rotor respectively.
Figure 3:
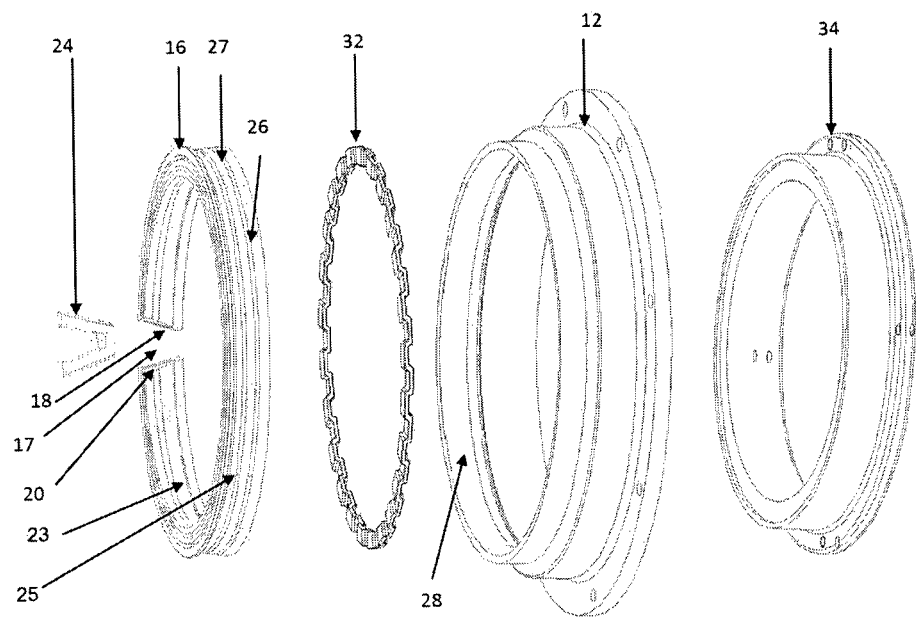
FIG. 3 illustrates an exemplary embodiment of the present invention depicting an exploded view of seal along with spring and back plate.

Unlike conventional mechanical seals which have sealing surfaces perpendicular to the seal axis, the invented seal has the sealing surface more or less parallel to the axis with a slight inclination and it can be seen in FIG. 2 that the inner edge is exposed to the fluid space (21) of the fluid handling machine and is not shrouded by 'rotor body end face' inside the stator. To ensure the similar surface (27) on second circular body (16) maintains a contact force on circumferential surface (28) of the first circular body (12), the second circular body has a geometric and metallurgic characteristic which include a lip (14), a split (17) and springiness such that the two ends at the split (17) tend to open up, exerting a radial and tangential load on the circumferential surface (28). The rotor body elements like gears, vanes etc. provides the shrouding for the split (17) such that the split (17) is not exposed to the working fluid and the front and the back faces of the 'rotor body element' cover the split (17) completely and it also provisions that radial seals fitted on its front and back faces for sealing fluid leakage past their peripheral surface, are accommodated outside of the split (17), and the split (17) lay in between the radial seals, thus isolating the split (17) from exposure to working fluid inside the fluid handling machine. In case of vanes which have a circular cross section along the axial direction of rotor, piston rings are used as radial seals. In gears where fine working clearances between stator and gear end and tip surfaces are maintained, the split (17) is shrouded by gear end face. To avoid any leakage of fluid that reaches the shrouded area, the split (17) is provided with a spacer (24) that has geometric and metallurgical characteristic that includes two legs that mate with the first split end (18) and second split end (20) when inserted inside the split (17) and held in position. The two legs of the spacer (24) have springiness such that it tends to open outward and compliment the outward opening tendency of the second circular body (16) at the split (17). The lip (14) on the second circular body (16) has spring characteristic that tends to flare the lip (14) outward at its free end and when assembled with the first circular body (12) exerts a radial force on the circumferential surface (28) and acts as a pre-stressed cantilever. The combination of the force exerted by springiness of lip (14) and opening tendency at split (17) is complimented further by force due to working fluid pressure inside the fluid handling machine exerted upon the internal end face (33) of the rotary seal (10) which has a radial component due to the inclination of the sealing surface contact. The combination of the forces due to springiness of second circular body (16) and gas force by working fluid, provide for radial, axial and tangential force during operation, thence sealing the fluid spaces from outside spaces and eliminating any circumferential clearances at seal areas along the rotor periphery that traps fluids and hence there is no passage for fluids to connect the spaces divided by 'rotor body elements'.

Further there is inclined surface (29) of greater inclination than the inclination of the sealing surface contact that mates with the rotor part (30) of the fluid handling machine and external spring (32), which can be a Belleville spring to exert the contact force between the mating surfaces of the second circular body (16) and rotor part (30). The angle of inclination provides a radial and an axial component where the radial component ensures sealing from fluid leakage between second circular body (16) and rotor part (30). The axial component is in the opposite direction of the fluid pressure and cancels it. Furthermore the geometry characteristic of thickness of second circular body (16) increases along the axial direction from inner edge towards outer edge, thence self compensating for any loss of contact force in case of wear of mating surfaces. This self compensation is complimentary to the compensation provided by the springiness characteristic. Furthermore the geometry thwarts the seal from squeezing into the fluid space (21) as shown in FIG. 2 inside the fluid handling machine. The second circular body (16) rotates along with the rotor part (30) with no relative motion between them and to avoid any relative motion a geometrical feature of the 'rotor body elements' is engaged with the spacer (24) thus imparting the torsion of the rotor part (30) to the spacer (24) and through to the second circular body (16) to ensure no slippage between second circular body (16) and rotor part (30).

The first circular body (12) can also have a lip (14) similar to the one on second circular body (16) and a similar inclined angle and a similar external spring (32), though its fastening with the stator does not warrant an external spring (32). The external spring (32) are loaded by back plate (34) against structural element of the fluid handling machine like the stator part (36) of the fluid handling machine.

The first circular body (12) and the second circular body can be inversed in placement wherein the first circular body (12) is the inner body and the second circular body (16) is the outer body, if so warranted.

There can be multiple number of partial split (17) which creates an opening on the second circular body (16) at the inner edge and extending for part of its axial length at multiple points in cases where there are multiple 'rotor body elements' and specially when these multiple rotor body elements are fitted on multiple individual constituent rotors that jointly form the rotor part (30) of the fluid handling machine, wherein there is one split (17) which parts the ring completely for providing the two split end faces.

The second circular body (16) has manifold (23) that receives lubricant supplied to it, which is then transported through oil holes (25) through the void (22) formed by the lip (14). A portion of this oil is further centrifuged through oil holes (25) and reach grooves (26) on the similar surface (27) of the second circular body (16) and is distributed between the mating surfaces at sealing surface contact through channels which are grooves perpendicular to groove (26) on the similar surface (27) that do not open at the inner edge. The remaining portion ejects out of the void (22) and removes heat of the rotary seal (10). The manifold (23) can be made on both first circular body and second circular body wherein the manifolds are for dedicated purposes of segregated lubricant and coolant supply.

The invention claimed is:

1. A rotary seal (10) for a fluid handling machine comprising:
   a first circular body (12) with a circumferential surface (28) that has an inclination to the central axis of said first circular body (12) and a second circular body (16) with a similar surface (27) that is inclined to the central axis of said second circular body (16) such that said second circular body (16) when assembled with said first circular body (12) coaxially, said circumferential surface (28) and said similar surface (27) mate with each other forming a sealing surface contact, wherein said first circular body (12) and said second circular body (16) is mounted on said fluid handling machine that constitute a rotor part (30) and a stator part (36), such that an internal end face (33) of said rotary seal (10) when assembled on fluid handling machine is exposed to fluids handled by said fluid handling machine, wherein said inclination is such that the fluid pressure on said internal end face (33) adds to the contact force at said sealing contact surface,
   wherein said first circular body (12) is continuous and said second circular body (16) has a split (17) and said second circular body (16) has a spring characteristic such that the two ends formed by the split (17), force away from each other, hence exerting a radial force on said circumferential surface when assembled with said first circular body (12) and compensating for circumferential wear during operation, wherein said second circular body (16), includes an inclined surface (29) that results in exerting an axial force on said rotor part (30) of said fluid handling machine on which said second circular body (16) is mounted on, by an external spring (32) on an external end face (31), wherein said second circular body (16) exerts a combination of axial, radial and tangential forces on said circumferential surface (28) which results in the force closure at said sealing surface contact, such that said rotary seal (10) does not require complete shrouding of said internal end face (33) and the edge of said sealing surface contact, from fluid within the casing during operation.

2. The rotary seal as claimed in claim 1, wherein said second circular body (16) has a lip (14) such that said spring characteristics imparts said lip (14) a tendency to flare outward wherein said lip (14) exerts a radial force on said circumferential surface (28) and compensates for wear along axial directions.

3. The rotary seal as claimed in claim 1, wherein the rotor part (30) is fitted with a rotor body element that segregates the volume between said rotor part (30) shrouds said split (17), thus avoiding exposure of the split (17) from working fluid in fluid spaces and provides the rotor body elements as a point of its fixation for said spacer (24) on the rotor such that said second circular body (16) is imparted with torsion from the rotor part (30) for rotating said second circular body (16) along with rotor part (30).

4. The rotary seal as claimed in claim 1, wherein said first circular body (12) and said second circular body (16) have said lip (14) that exerts contact pressure at the said sealing surface contact, wherein said first circular body (12) and said second circular body (16) includes said inclined surface (29)

such that said inclination is such that the force by fluid pressure on said internal end face (33) adds to the force at said sealing surface contact.

5. The rotary seal as claimed in claim 1, wherein the split (17) is fitted with a spacer (24) with a pair of legs with springiness that forms a second sealing contact surface with the two ends of said split (17) to block any leakage and to exert an additional parting force on the two ends of said split (17).

6. The rotary seal as claimed in claim 5, wherein said spacer (24) is inclined in at least in any one of axial and radial directions.

7. The rotary seal as claimed in claim 1, wherein said second circular body (16) comprises at least a manifold (23) for supply of lubricating oil through at least an oil hole (25) to a void (22) to supply oil through at least a groove (26) with distribution channel for the lubricant supply at said sealing surface contact between said first circular body (12) and said second circular body (16) such that the lubricating oil also acts as a coolant for cooling of said rotary seal (10).

8. The rotary seal as claimed in claim 7, wherein said first circular body (12) and said second circular body (16) has at least a manifold (23) for supply of lubricating oil through at least an oil hole (25) to said void (22) to supply oil through at least a groove (26) with distribution channel for lubricant supply at said sealing surface contact between said first circular body (12) and said second circular body (16) such that the lubricating oil also acts as a coolant for cooling of said rotary seal (10).

9. The rotary seal as claimed in claim 8, wherein at least one of said manifold (23) and said oil hole (25) is used for lubricating and at least one of said manifold (23) and said oil hole (25) is used for cooling.

* * * * *